(12) United States Patent
Taieb et al.

(10) Patent No.: US 7,707,257 B2
(45) Date of Patent: Apr. 27, 2010

(54) SYSTEM AND METHOD FOR TRANSFORMING A THREAD OF EMAIL MESSAGES INTO A REAL-TIME MEETING

(75) Inventors: David D. Taieb, Charlestown, MA (US); Thangaraj Veerappan, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 11/769,166

(22) Filed: Jun. 27, 2007

(65) Prior Publication Data

US 2009/0006558 A1    Jan. 1, 2009

(51) Int. Cl.
*G06F 15/16*    (2006.01)
(52) U.S. Cl. .................. 709/206; 709/204; 709/205
(58) Field of Classification Search .............. 709/204, 709/205, 206
See application file for complete search history.

(56) References Cited

U.S. PATENT DOCUMENTS

| | | | |
|---|---|---|---|
| 7,487,214 B2 * | 2/2009 | Qureshi et al. .............. 709/206 |
| 2002/0087645 A1 * | 7/2002 | Ertugrul et al. ............. 709/206 |
| 2004/0054737 A1 | 3/2004 | Daniell | |
| 2004/0122693 A1 | 6/2004 | Hatscher et al. | |
| 2004/0215721 A1 * | 10/2004 | Szeto et al. ................. 709/204 |
| 2005/0009541 A1 | 1/2005 | Ye et al. | |
| 2005/0132012 A1 | 6/2005 | Muller et al. | |
| 2006/0031331 A1 | 2/2006 | LoBuono et al. | |
| 2006/0053196 A1 | 3/2006 | Spataro et al. | |
| 2006/0090137 A1 | 4/2006 | Cheng et al. | |
| 2006/0168026 A1 | 7/2006 | Keohane et al. | |
| 2007/0179989 A1 * | 8/2007 | Maes ......................... 707/201 |

* cited by examiner

*Primary Examiner*—John Follansbee
*Assistant Examiner*—Nghi V Tran
(74) *Attorney, Agent, or Firm*—Ayla Lari; Hoffman Warnick LLC

(57) ABSTRACT

A system and method for transforming a thread of email messages into a real-time e-meeting. Collaborative processing between asynchronous and synchronous components are controlled through a UI which controls the selection of threaded messages and initiates an e-meeting including all the recipients of the thread, each participant may privately view the full content of the message by selecting the message, and the moderator has the option to terminate the real-time meeting. Any participant who accepts the invitation can see a synchronized inbox that is limited to the selected thread. A final summary of the decisions is then sent as a final message in the thread, thereby being captured in everyone's inbox.

9 Claims, 4 Drawing Sheets

SYSTEM AND METHOD FOR TRANSFORMING A THREAD OF EMAIL MESSAGES INTO A REAL-TIME MEETING

FIELD OF THE INVENTION

The present invention relates generally to emails and e-meetings systems and, more specifically, to improvements to systems and methods for transforming a thread of email messages into a real-time e-meeting.

BACKGROUND OF THE INVENTION

Many times, users are communicating via email and instant messaging (IM) concurrently. However, present electronic messaging (such as email) systems have become unwieldy when threads of email messages are exchanged between a large number of recipients. An "email thread" is a string of related emails—generally generated through replies or forwards of the emails. These threads of mail messages become difficult to follow and keep track of in a business environment. This leads to confusion and loss of productivity, resulting from email overload.

This limitation is partly due to the asynchronous nature inherent to email systems. Email systems are not a natural fit in this situation. For example, this could lead to one participant's response being out of sequence with other people's responses. This is especially pronounced when the frequency of responses and/or the number of participants responding to the original email increases dramatically over a short period of time.

There is a need for a solution for transforming a thread of mail messages, as described above, into a real-time e-meeting, or IM conversation, with all of the participants.

Instant messaging (IM) is a form of real-time communication between two or more people based upon typed text. The text is conveyed via computers connected over a network such as the Internet. Email is, of course, another form of electronic communication but in a more asynchronous manner in that email messages are generally delivered with a time delay in contrast to IM messages which are delivered relatively instantaneously.

Because people use both types of communication, sometimes at the same time, it would be useful for the two types of electronic communication to collaborate. It would further be useful for an email thread to be aggregated or otherwise collected and displayed on the displays of the recipients in the email thread. Further, it would be useful if the user's inbox was synchronous so that the user could choose a user interface button to invite all participants to review the thread in real time so that any participants who accept would see a synchronized inbox that is limited to the thread in question, but the remaining semantics of the Inbox are left intact (i.e., visualization, commands such as "Reply" and "Forward", etc). There would be no need to transmit the data within the email since all participants already have it stored locally in their inbox.

Some systems provide ways to trace back from an IM message to an email thread. The chat transcript is then stored back to the email thread. However, they are limited to a one to one mapping only and don't provide any aggregation techniques for abstracting an email thread into one entity and providing it to the thread recipients while keeping the email messages and chat messages distinct.

In view of the foregoing, a need exists to overcome these problems by providing a system and method for a system and method for transforming a thread of email messages into a real-time e-meeting.

BRIEF SUMMARY OF THE INVENTION

The present invention provides a system and method for transforming a thread of email messages into a real-time e-meeting. Collaborative processing between asynchronous (threaded e-mail/messaging) components and synchronous (real-time chatting/e-meetings/instant messaging) components are controlled through a user interface (UI). The UI controls the selection of one or more of the threaded messages and automatically initiates a real-time e-meeting including all the recipients of the threaded mail messages, displays a message adjacent to the person who created the message, each participant may privately view the full content of the message by selecting the message, and the user has the option to terminate the real-time meeting.

A user can push a single button to invite all participants to review the thread in real time. Any participant who accepts the invitation can see a synchronized inbox that is limited to the selected thread, but the remaining semantics of the inbox are left intact (i.e., visualization, commands such as reply and forward, etc). A final summary of the decisions is then sent as a final message in the thread, thereby being captured in everyone's inbox. Alternatively, a user can manually initiate the summary at any time during the meeting and have a summary up to that point in the meeting sent to the meeting attendees during the meeting.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

The drawings are intended to depict only typical aspects of the invention, and therefore should not be considered as limiting the scope of the invention. In the drawings, like numbering represent like elements between the drawings.

DETAILED DESCRIPTION OF THE INVENTION

The present invention provides a system and method to improvements to systems and methods for transforming a thread of email messages into a real-time e-meeting.

Figure 1:
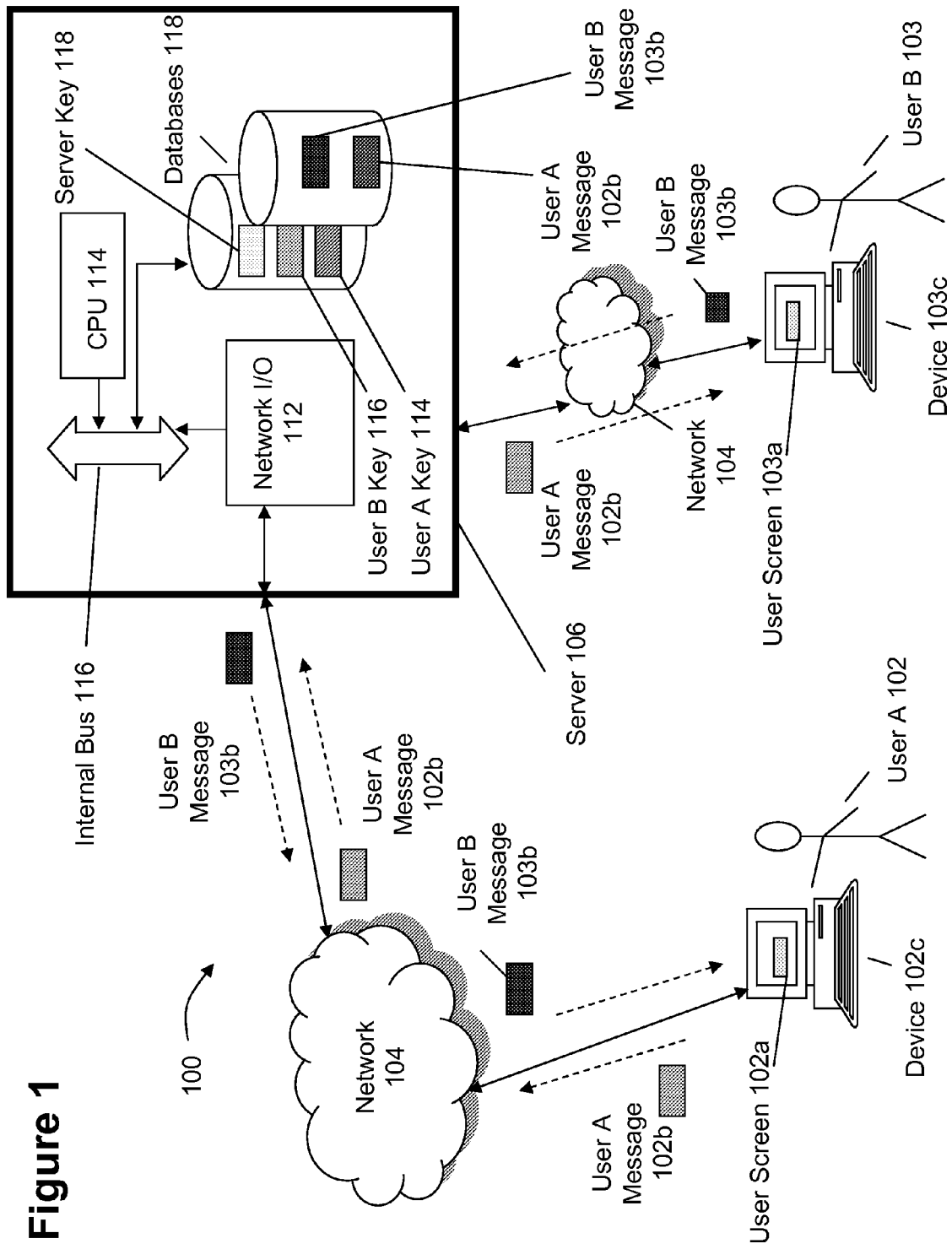
FIG. 1 is a diagram which illustrates the system and method of the present invention for transforming a thread of email messages into a real-time e-meeting.

FIG. 1 illustrates a basic email and IM system 100. User A 102 wishes to communicate with User B 103. Instead of phoning, User A 102 uses email or instant messaging to communicate with User B 103 or other users. The email and instant messaging system allows User A's and User B's screens 102a, 103a to illustrate the email thread (or string of emails) and/or IM "conversation" between User A 102 and User B 103. Email messaging requires an email client while instant messaging requires an instant messaging client, generally installed on a general purpose computer which has a communications device that connects to an email and instant messaging (IM) server 106 via Network 104. (However, the Devices 102c, 103c don't need to be personal computers as they can as easily be cell phones, PDAs and the like.) Like many servers, Server 106 has a network input/output device 112 to receive and send messages, one or more CPUs 114, databases 118 to store email thread and IM messages and other data related to conversation sessions, and an internal bus 116 like other computers. User A Message (Data) 102b is stored in Databases 118 and is forwarded to User B 103 to be displayed on Device 103c on User B's Screen 103a. Also, according to typical security procedures, User A has a Key 114, User B 116 has a key, and Server 106 has a Key 118 for authentication purposes. Likewise, User B 103 may send User B Message (Data) 103b to be displayed on User A's 102 display 102a.

Figure 2:
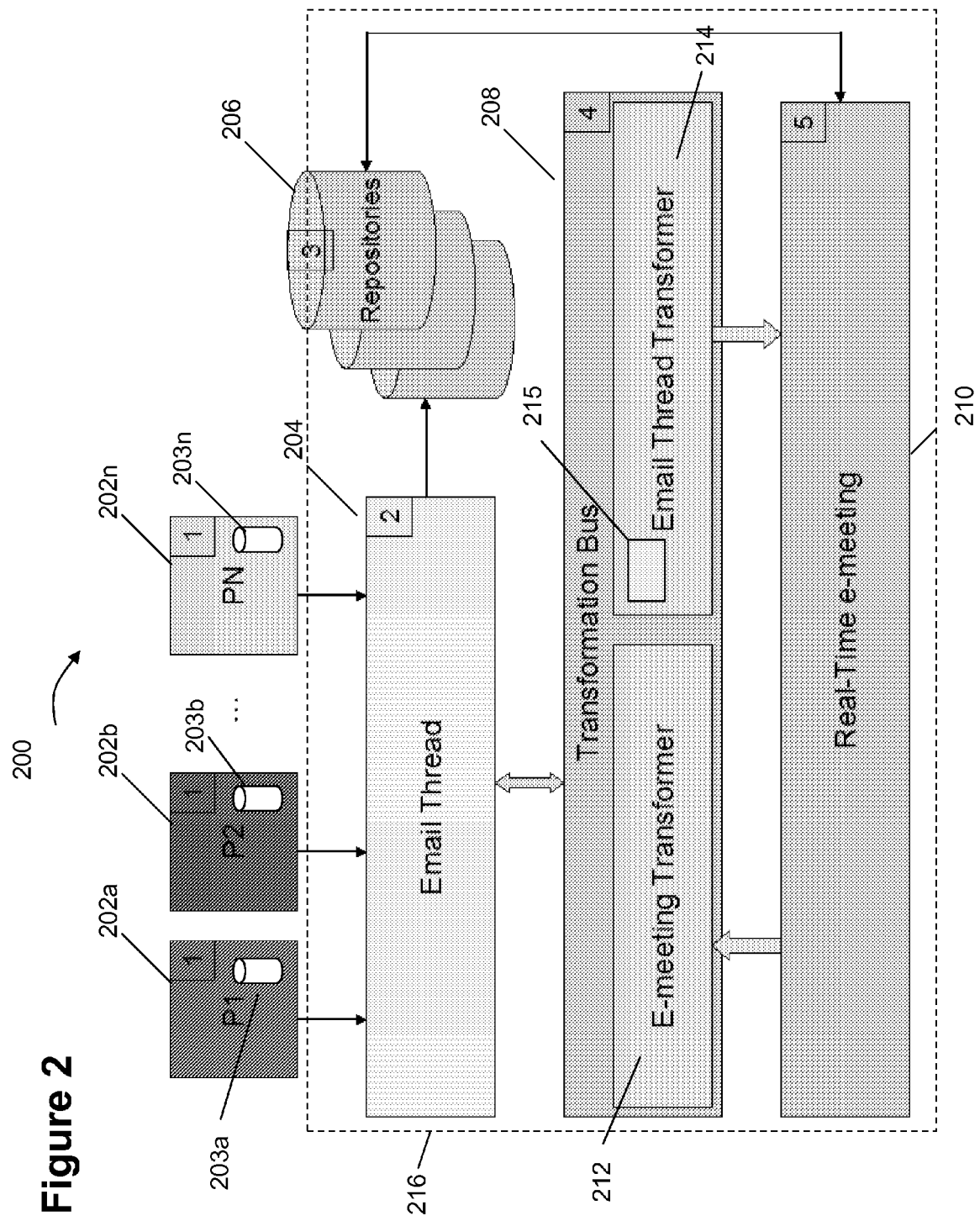
FIG. 2 illustrates the system of the present invention for allowing participants to communicate with one another.

FIG. 2 illustrates the System 200 of the present invention for allowing participants Participant P1 202a, Participants P2 202b, through Participant PN 202n to communicate with one another. The Participants can communicate electronically via email, instant messaging, electronic meetings (emeetings), and other forms of electronic communication. System 200 has an Email Processor 204 for processing emails between Participant P1 202a, Participants P2 202b and Participant PN 202n. Email Processor 204 processes emails between Participant P1 202a, Participants P2 202b and Participant PN 202n by passing the emails between the participants. Participant P1 202a, Participants P2 202b and Participant PN 202n each receive emails and store them locally in Storage Areas 203a, 203b and 203n. These emails are stored in threads if they are related to one another, such as being a Reply, Reply to All or Forward.

In addition, the emails or emails threads are stored in Collaboration Server 216 in Repositories 206. Collaboration Server 216 further has a Transformation Bus 208 which has an Ethread Transformer 214 and an Emeeting Transformer 212. The Ethread Transformer 214 and an Emeeting Transformer 212 are utilized for transforming the thread into a real-time emeeting in Real-Time Emeeting Processor 210. Email Thread Transformer 214 further has a Summarizer 215 which summarizes the messages of the selected email thread and provides those summaries to the participants of the emeeting.

In summary, the components that implement this invention include a button (or similar widget or menu item) in the email agent, a mechanism to select one or more mail messages in a thread, a system to convert the contents of the mail messages in the thread into a Real-Time meeting, a summarizer for summarizing the messages of thread, displays for each participant so that each message summary will be displayed alongside the participant who created it. The system and method of the present invention allows each participant to be able to privately view the full content of the message by selecting it. This is in addition to the real-time meeting UI component that gets created. Upon termination of the real-time meeting, the moderator can optionally choose to mail the contents and/or persist it as meeting transcript. Further, the moderator may choose to manually initiate, during the meeting, to send the transcript or summary of the transcript to the other attendees or a subset of the attendees.

Figure 3:
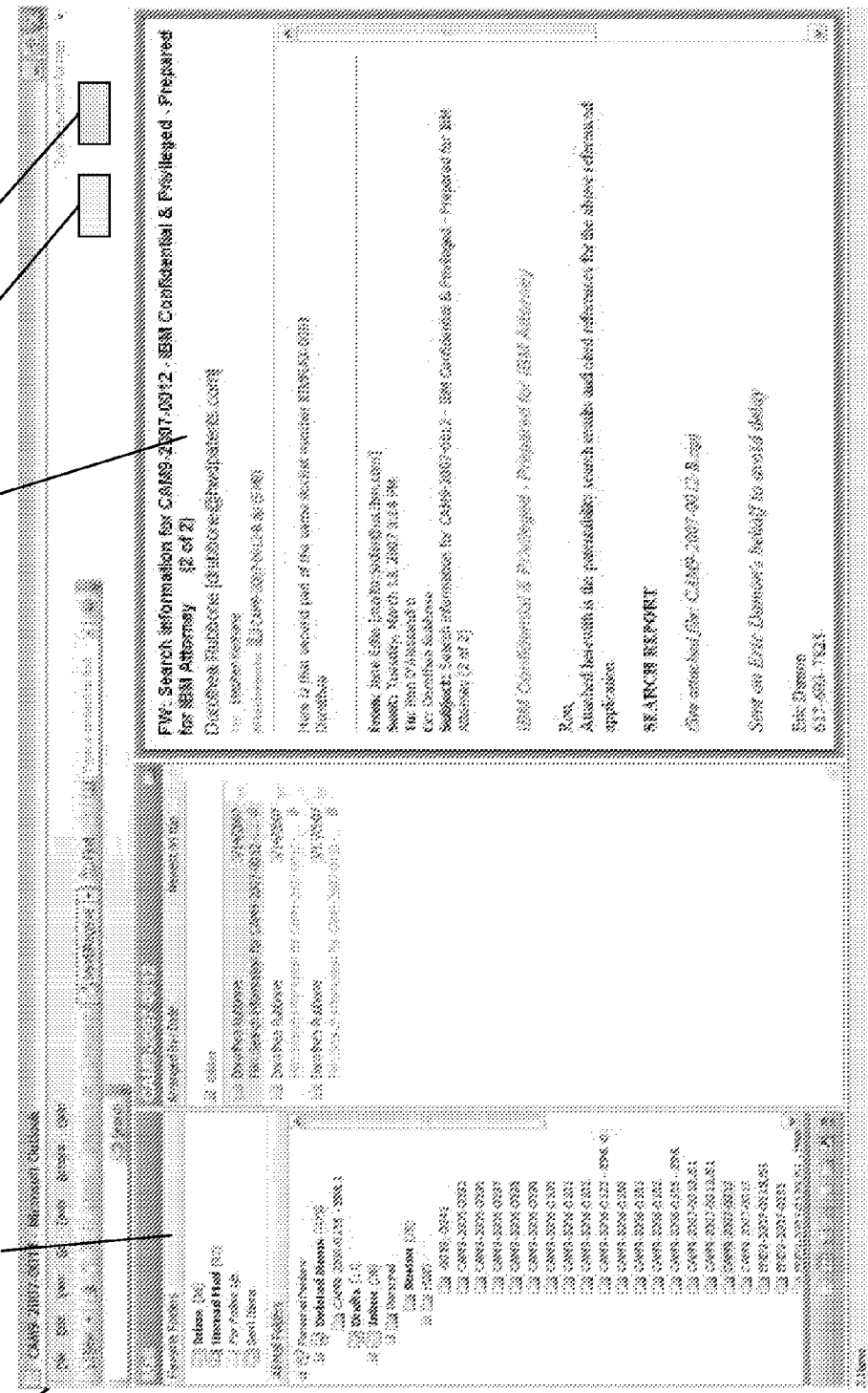
FIG. 3 illustrates the system and method showing illustrates an exemplary display, or User Interface (UI) of the present invention.

FIG. 3 illustrates an exemplary display, or User Interface (UI) 300 of the present invention. UIs accept input via devices such as computer keyboard and mouse and provide articulated graphical output on the computer monitor. "Buttons" are located about the UI for the user to select. Most email clients UIs have a number of panels or frames. Along the left hand side of the UI, generally, is a Navigation Panel 302 having Directory Frame 304 indicating the directory of folders stored by the email client. On the right hand side, generally, there is a Text Display Frame 306 where the user utilizes to scan the email context. Of course, the UI 300 has the typical Command Line 307 and buttons for the user to select via mouse clicks or keyboard action. One of the folders may store an email thread of interest to the user. When a user identifies an email thread that he has an interest in, he may decide that he needs further explanation of the thread or to get the other participants to otherwise become involved. As such, the user interface of the present invention UI 300 further has a Select Thread Button 310 to select the thread of interest and a Create Emeeting Button 308 which allows the user to create an emeeting after a thread has been selected and invite the other participants of an email thread selected by the user. By selecting this Create Emeeting Button 308, the Email client will indicate to the Server 216 to automatically initiate a Real-Time e-meeting inviting all the recipients of the threaded mail messages.

Figure 4:
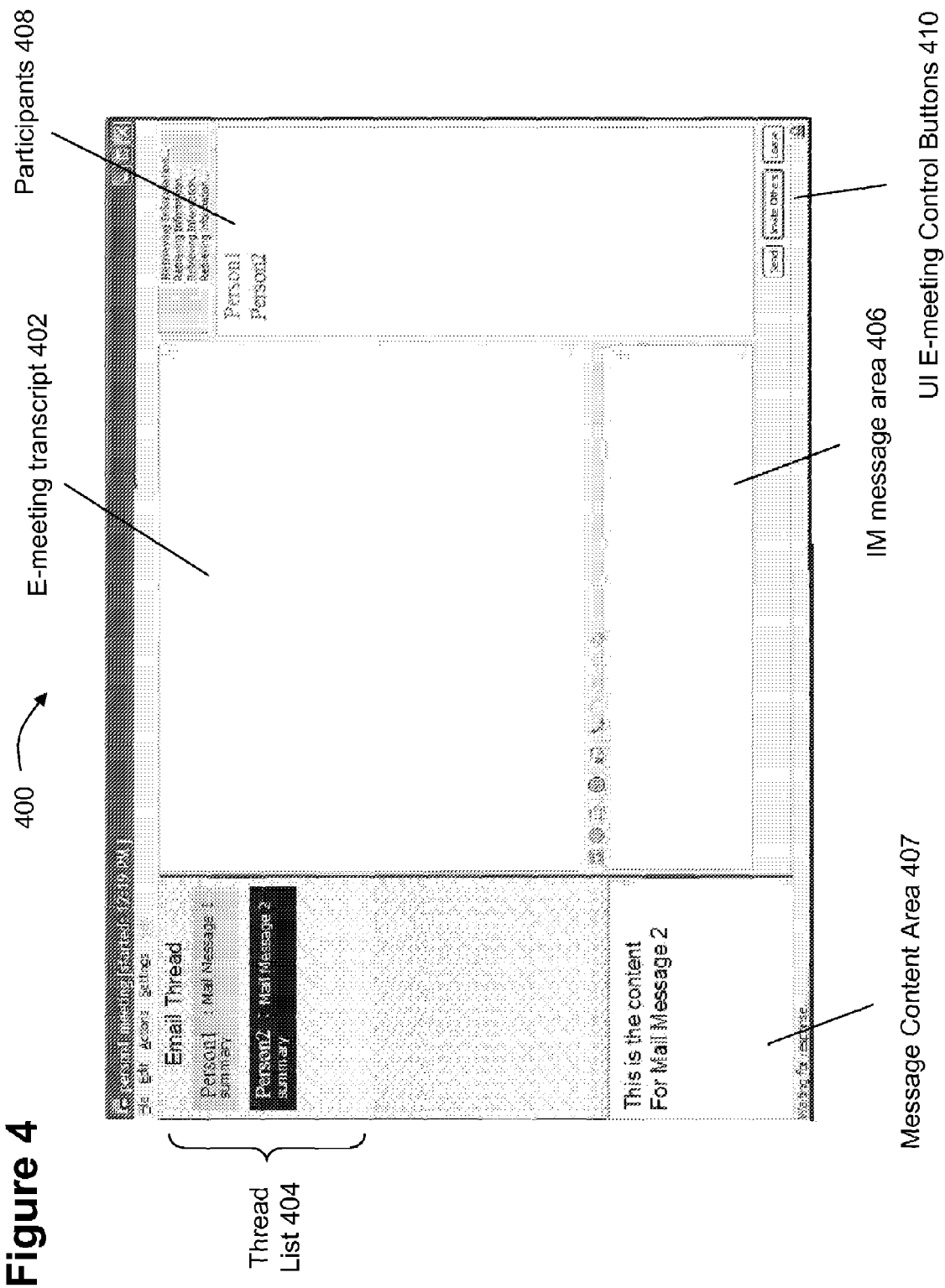
FIG. 4 illustrates the system and method of the present invention showing an exemplary display of the present invention.

FIG. 4 illustrates an exemplary display 400 of the present invention having Emeeting Transcript Display Area 402, Thread List 404, IM Message Area 406, Message Contents Area 407, Participants List 408 and UI Emeeting Control Buttons 410. Emeeting Transcript Display Area 402 displays the transcript of the Emeeting. Thread List 404 displays the list of emails messages in the selected Ethread. IM Message Area 406 shows the user the current IM being typed by the user. Message Contents Area 407 shows the contents of the message of the thread which has been selected while the Participants List 408 shows the present participants in the emeeting. UI Emeeting Control Buttons 410 allow the user to control the UI emeeting. Message Contents Area 407 allows the user to privately view the message contents or a summary of the message contents.

E-meetings today generally have some notion of an agenda which lists the content that will be reviewed. The method and system of the present invention allow the participants to click on the elements of the agenda changes. As such, the email thread is provided by the moderator (or a designee) to the participants as the starting agenda of a newly created meeting, and as the moderator (or a designee) clicks on, or selects, individual emails, the main view changes for the participants. This allows the meeting to center on the contents of the email thread in a synchronized fashion.

The system and method of the present invention provides that the participants will have a "private" viewing capability where individual attendees can look at individual email without forcing everyone else to change their view. The private view is in addition to the synchronized view of the thread. New material can be introduced to the emeeting, once it has started, that didn't have anything to do with the original email thread.

Once the emeeting has concluded, a final summary message is sent to all participants as a "closing" email on the same thread, so that everyone involved gets the summary. Alternatively, the moderator (or designee) may choose to manually initiate the emeeting transformer to send a summary of the emeeting during the meeting of the meeting up to that point during the meeting. In that way, the attendees or subset of attendees can receive a summary of, say, the first part of the meeting during the meeting.

Using the system and method of the present invention, the user can be in his inbox getting frustrated with a long thread, and push a single button to invite all participants to review the thread in real time. Everyone who accepts would see a synchronized inbox that is limited to the thread in question, but the remaining semantics of the inbox are left intact (i.e., visualization, commands such as Reply and Forward, etc.). There would be no need to transmit the data within the email because all participants already have it stored locally in their inbox. Users will just be transmitting synchronization messages and a final summary of the decisions is then be sent as a final message in the thread, thereby being captured in everyone's inbox.

The present invention provides a shared area viewed by all participants which allows the moderator to display a particular email content It allows participants to extend the contents of the emeeting to add more materials including material that was not connected to the original email thread. This can be done by adding a button that allow the user to create a new entry in the email thread list.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for transforming an email thread into an instant messaging (IM) conversation, the email thread comprising a plurality of related emails, the method comprising:
   receiving an indication from a participant in the email thread to transform the email thread into an IM conversation with the other participants of the email thread, wherein the plurality of plurality of related messages in the email thread have previously been received and stored by a respective email client of each participant in the email thread;
   inviting the other participants in the email thread to review the email thread in real time in an IM conversation, the inviting comprising:
      identifying the other participants in the email thread;
      collecting the IM addresses of the other participants in the email thread; and
      sending an invitation to the other participants in the email thread using the collected IM addresses;
   collecting, by each participant in the email thread, the plurality of previously received messages in the email thread stored by the respective email client of the participant;
   creating an IM conversation between the participants in the email thread; and
   displaying the plurality of messages in the email thread in the IM conversation to the participants.

2. The method of claim 1 further comprising the step of allowing a participant to push a single button to invite some or all of the other participants to join the IM conversation and to review some or all of the email thread in an IM conversation.

3. The method of claim 2 further comprising the step of allowing the participants to accept or reject the invitation and any participant who accepts the invitation sees a synchronized inbox that is limited to the email thread while allowing the remaining semantics of the in box to be left intact.

4. The method of claim 3 further comprising the step of sending a final summary of the decisions as a final message in the email thread and, thereby, being captured in the inbox of any participant who has accepted to join the IM conversation.

5. The method of claim 3 further comprising the step of allowing a moderator of the meeting to manually send, during the meeting, a summary of sending a summary of the decisions up to that point in the meeting as a message in the email thread and, thereby, being captured in the inbox of any participant who has accepted to join the IM conversation.

6. The method of claim 1 further comprising the step of presenting the email thread as a proposed agenda to the participants.

7. The method of claim 6 further having the step of receiving selections from the participants to change the agenda and passing those selections to the other participants.

8. The method of claim 1 further having the step of allowing a participant to have a private viewing of the email thread or other email in the participant's inbox.

9. The method of claim 1 wherein the participants' inboxes are synchronized.

* * * * *